July 21, 1964 M. ROUANET 3,141,629
SPINNING REEL WITH FRICTION BRAKE
Filed April 29, 1960 2 Sheets-Sheet 1
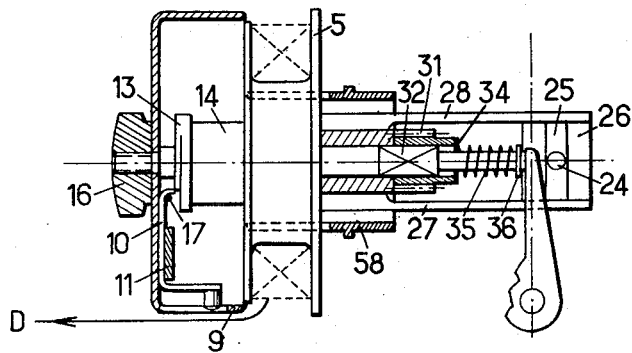
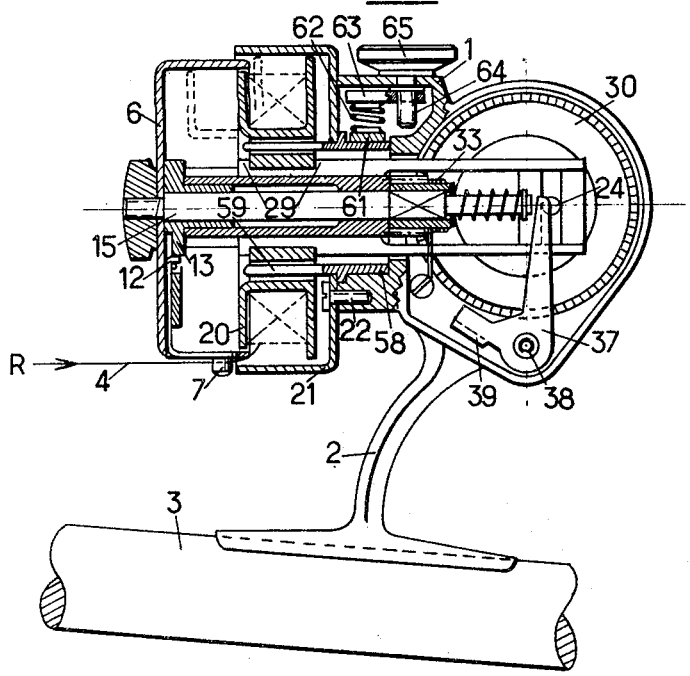
Inventor
M. Rouanet

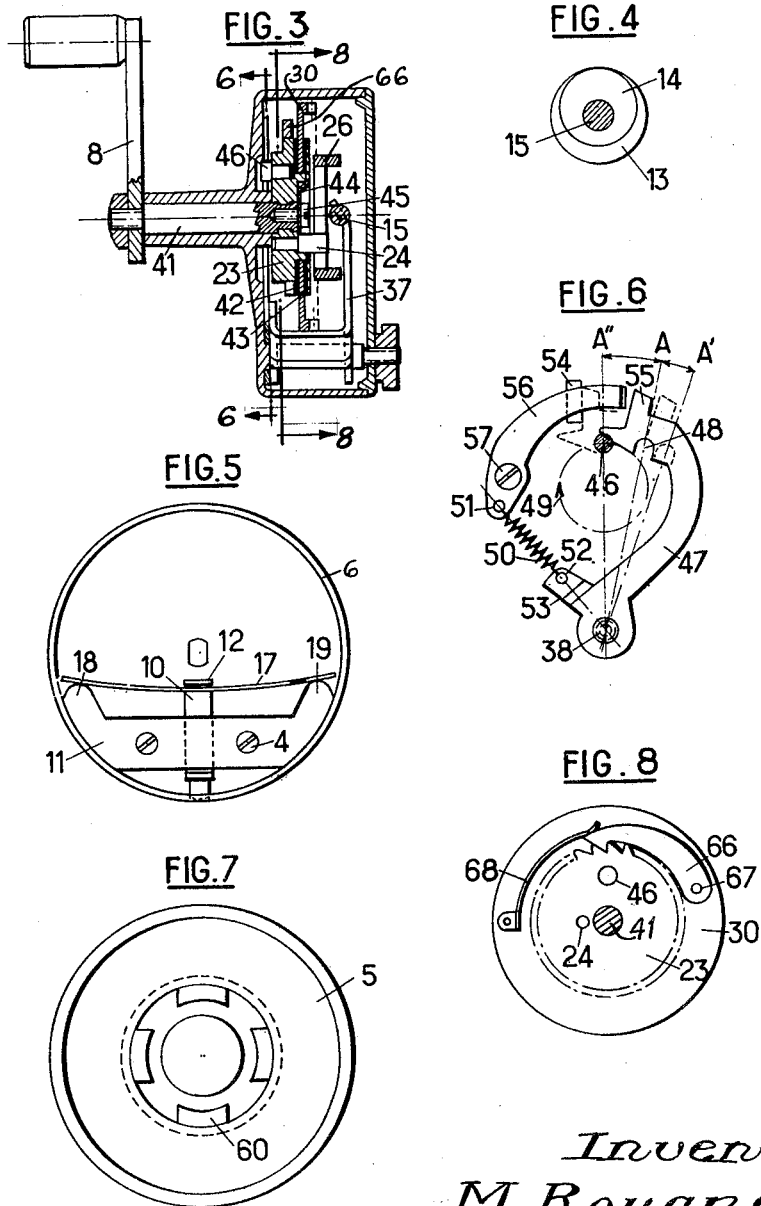

3,141,629
SPINNING REEL WITH FRICTION BRAKE
Michel Rouanet, 27 Rue des Girondins,
Saint-Cloud, France
Filed Apr. 29, 1960, Ser. No. 25,607
Claims priority, application France June 9, 1959
12 Claims. (Cl. 242—84.21)

The present invention relates to fishing reels having a line drum or spool which does not rotate during the bait casting operation but allows line to pay out from the spool. In such reels when the line is retrieved a pick-up guides the line onto the spool, and either the pick-up or the spool may be rotated to wind the line on the spool.

More particularly, my invention relates to fishing reels of the type described in the Patent No. 2,600,558, in which the rotatable flyer carrying the line pick-up and the line drum or spool are axially slidable relatively to one another to either a remote line casting position or an adjacent line rewinding position.

The object of the present invention which may be considered as an improved embodiment for the said type of reel, is to fit the reels with a more strongly built and simple mechanism, and with a more reliable pick-up system.

The embodiment according to my invention includes several improvements relative to the pick-up device and to the brake device which permit, while the reel is operative, to wind in the line for landing the fish and the line to pay out as may be necessary to keep the fish from breaking the line.

The embodiment is described hereunder, and shown in the annexed drawings, in which:

FIGURE 1 is a partial axial section, the spool being shown in elevation,

FIGURE 2 is an axial section of the reel in winding condition,

FIGURE 3 is a section through the axis of the crank, looking to the right in FIGURE 2, FIGURE 4 is a detailed drawing of the cam element 13 of FIGURE 2, FIGURE 5 shows the pick-up return device shown in elevation. This is a view of element 6 of FIGURE 1 looking toward the left, FIGURE 6 is a section taken on line 6—6 of FIGURE 3, FIGURE 7 represents the spool and its hub shown in elevation, and FIGURE 8 is a section taken at 8—8 of FIGURE 3 showing only the drive connection between hub 23 and gear 30.

The housing of the reel is generally designated 1, with a support 2 through which the reel is fixed to fishing rod 3 that is parallel or nearly parallel to the axis of the reel. The line 4 is wound on or unwound from spool 5. Such spool, as the line is rewound, performs a reciprocating motion of translation. Both remote positions are shown in FIG. 2, one being represented by a dotted line. Such conventional motion is performed in order to distribute the line evenly on the spool in rewinding. The shell-shaped pick-up holder of flyer 6, fixed in front of the spool, holds a pick-up 7, which causes the line to be rewound on the spool when flyer 6 is rotated. Flyer 6, by translation, may be shifted to either position represented in FIGS. 1 and 2, respectively, as will be explained below. The usual hand crank 8 controls on one hand the motion of translation of the flyer when the handle is rotated through a limited angle in one direction, and on the other hand provides for the alternate motion of spool 5, and simultaneously the rotation of flyer 6, when the hand crank is actuated in the reverse direction.

The previous information should be considered as known in the art and representing the type of reel which mechanism is improved by the invention in the description to follow.

According to the invention the pick-up device comprises a knob 7 which may retract or protrude relative to the external surfaces of the cylinder flange or ring 9 of flyer 6 through a hole provided in such flange. For that purpose, knob 7 is fixed on a bent support 10 which is slidingly guided by the inner face of the flyer and by a plate 11 secured on such face. The end 12 of support 10 is bent to provide a shoulder which is pressed by spring 17 on a camming surface of and excentered relatively to socket 14, rigid with housing 1, or formed by the end of this socket.

The flyer 6 is fixed on the end of shaft 15 by a nut 16. Shaft 15 moves freely in translation and rotation relative to socket 14, so that, in accordance with the position of the flyer (FIGS. 2 or 3), shoulder 12 of support 10 is engaged or disengaged by the cam. The result of such arrangement is that the protruding end of pick-up 7 out of flange 9 is controlled by the relative motion of translation of shaft 15 relative to socket 14, and by a limited rotation of the shaft.

A leaf or wire spring 17 which bears near its ends on two projecting ends 18, 19 of plate 11 secured to flier 6 (FIG. 5) actuates shoulder 12 in order to cause inward radial movement of the pick-up when permitted by the position of the camming surface (position of FIG. 1).

The line is hooked by the knob 7, in protruding position, FIG. 2; and this is made easier due to the cover 21 fixed by a screw 22 in front of housing 1, which delimits the ring-shaped clearance through which the line may escape; the pick-up 7 extends across said clearance, when the flyer rotates in the rewinding motion.

Spool 5 is alternately moved by the following mechanism; hub 23, which rotation is controlled by hand crank 8, is fitted with a spur 24 which fits into a slit 25 of a cap 26 bearing two arms 27, 28 sliding into grooves of socket 14, which forms a hub on which spool 5 may freely move. Arms 27, 28, by two shoulders 29 protruding out of the guiding grooves, insert spool 5 on each side, so that this spool is controlled in translation by arms 27, 28 while it may still rotate relative to socket 14.

The rotation of flyer 6 is provided from a toothed wheel 30 by a hollow pinion 31, which is fitted inside by a part of square section of shaft 15, which thus is rotated, but remains free in translation. According to a practice common in the art, a spiral torsion spring 33 coiled on the hub of pinion 31 is used to allow the rotation in a sole direction, here the direction corresponding to the rewinding of the line.

Pinion 31 is secured on one hand by a shoulder ring of socket 14 and on the other hand by a ring 34 upon which presses coil spring 35 on shaft 15, which diameter is reduced beyond section 32. On the other hand, the coil spring rests on ring 36, keyed on shaft 15.

The axial movement of shaft 15 is caused by bent lever 37 swivelling on 38 and having a bent portion 39 forming a shoulder. Said shoulder is operatively connected with hand crank 8 through an escapement mechanism, pointed out in the description to follow.

The gear wheel 30 which is centered on the rotation axis of hand crank 8 is mounted to rotate freely on hub 23 keyed on the shaft 41 of the crank 8. The hub 23 is operatively connected for rotation with wheel 30 by means of a friction device including two friction washers 42, 43, pressed by the laminated or disk spring 44, which itself is secured by a screw 45 in shaft 41. Washer 42 is inserted between hub 23 and wheel 30, washer 43 is inserted between wheel 30 and spring 44, the latter presses the assembly, whereby the washers frictionally grip the wheel 30. To give a positive drive between hub 23 and gear 30 in the reeling-in direction of rotation a pawl 66 may be used mounted on gear 30 by pivot 67 and pressed by a spring 68 against ratchet teeth on the edge of hub 23, in which case it will be noted that as reverse rotation of hub 23 is effected pawl 66 clicks over the ratchet teeth of hub 23. Gear 31 is held stationary because it and gear 30 are biased in the reverse direction of rotation of crank 8 by the friction drive between hub 23 and gear 30 and clutch 33 prevents reverse rotation of gear 31. Upon rotation of crank 8 in the reeling-in direction, lever 47 and therefore lever 37 are moved to release the shaft 15 for movement toward reeling-in condition as it is biased to do by spring 35. The inner end of pick-up 12 moves toward the spool and is engaged by the eccentric cam 14 and so is forced radially outwardly until it rides on the concentric portion 13 of the cam element. It will be noted that the crank 8 will always be in the same position with respect to the fishing pole whenever the reel is conditioned for casting.

Thus the rotation of flyer 6 is insured in the rewinding owing to the friction device but because spring 33, though the hand crank may be operated in the reverse direction the flier cannot be reversed, and gear 30 will not reverse in rotation.

Pin 46 is supported at the rear of hub 23 and its function is illustrated by FIG. 6 (see section line 6—6 of FIG. 3). Such pin cooperates with a one-direction escapement device, composed of an anchor 47, oscillating on axle 38. A slot 48 is provided in such anchor and is designed to hook pin 46 when it runs in the opposite or reverse direction of arrow 49 and it is shaped in order not to disturb the rotation of pin 46 in the direction of arrow 49 which is the forward direction corresponding to the rewinding. Anchor 47 is returned in median position A, represented by a line, by spring 50, one end of which is secured in 51, a fixed point, and the other end is secured in 52, on shoulder 53 of anchor 47.

Anchor 47 may be driven, when the crank is turned in the reeling-in direction by the pin 46 into position A', and in the other direction to position A'', positioned by a stop 54. Position A' of FIG. 6 corresponds to the winding in position, represented in FIG. 2, of the knob 7 of the flier 6 and of the lever 37. Position A'' of FIG. 6 corresponds to the casting position, represented in FIG. 1, of knob 7 and of lever 37. In the displacement A'', anchor 47, through its shoulder 55, fits under the end of spring 56, composed of a blade which is slightly bent. Such spring is secured to the housing at 57 and holds the anchor and thus pin 46 in position A'', such locking being overcome only by rotation of the hand crank providing the rotation of pin 46 in the direction of arrow 49.

During the displacement A' to A'', shoulder 53 of the anchor operates on shoulder 39 of lever 37, that is, a on-direction connection to press against shoulder 39 to rotate lever 37 anticlockwise in FIGURE 1.

Crank pin 24 which, operating in slot 25 of element 26, causes the reciprocation of the spool as the flier is rotated, is positioned so that when the pin 46 is turned through the angle A', A, to A'' the spool 5 is placed in its most rearward position. So, it will be seen that in casting condition the flier 6 is positioned as far forward as possible, and the spool 5 is positioned as far to the rear as possible to assure free flow of the line from the spool.

The braking system prevents normally the spool 5 from rotating, but allows the same to rotate; hence, the line to pay out from the spool as may be necessary to keep the fish from breaking the line. This conventional braking is performed by improved means, including a drum 58, which is solid in rotation with the spool, by means of four stems such as 59 engaging slidably four corresponding holes 60 provided within the hub of the spool, as shown in FIG. 7. The shoe 61 of the brake rubs against the outer face of the drum, and is pressed by spring 62, the other end of which rests on a tappet 63 moving on the guiding rod of the spring, such tappet being solid with a nut in which fits screw 64, driven by knob 65. Thus it is possible to regulate the tension of spring 62, which is generally set slightly within the line rupture.

The operation has been explained in the description above. It will, however, be completely explained against in the following description. In the rewinding position, FIG. 2, it may be seen that the rotation of the crank insures the rotation of the flyer 6 through wheel 15 and pinion 31 while the alternate motion of the spool is insured through hub 23, spur 24 and cap 26. The line is seized by pick-up 7 and rewinds evenly.

Once the line is rewound and for a new cast, the fisherman turns crank 8 in reverse direction relative to the winding-in direction, until a resistance is felt as anchor 47, driven by pin 46, is stopped by stop 54. In such motion, shoulder 53 of anchor operates shoulder 39 of lever 37, which pushes shaft 15, thus driving pick-up holder 6 in the position of FIG. 1, in which support 10 is not stopped any more by cam 13 and is returned by spring spring, thus retracting pick-up 7 inside the flyer 6. As spool 5 is completely free, it is possible to cast easily.

To take back the line, the fisherman runs the crank in the direction of the rewinding. Pin 46 takes anchor 47 back into position A', thus releasing lever 37. Flyer 6 comes back to the right hand side owing to spring 35. Cam 13 inserts shoulder 12 of support 10, thus providing the protruding of pick-up 7 out of the flyer, which can now seize the line.

What I claim is:

1. In a fishing reel including a housing, a spool arranged to hold a line and mounted for free delivery of the line therefrom substantially axially of the spool, a line pick-up device including an axially displaceable flier arranged to encircle the spool, crank means rotatable in one direction for rotating the flier to wind in the line when said flier is in spool encircling position, means operated by said crank means for imparting to said spool a reciprocating axial movement in combination with said flier rotation, a pick-up member mounted in said flier for radial movement, lever means for axially displacing the flier from a position encircling the spool to a position remote from the spool and biasing means to cause return movement of said flier in the other direction to return the flier to a position encircling the spool, said crank means being rotatable to a limited extent in a reverse direction, and means rotated by said crank in said reverse direction to engage and actuate said lever to displace said flier axially, and a cam fixedly mounted with respect to said housing, said cam being shaped and being operatively positioned with respect to said pick-up member to engage and displace said pick-up member in radial outward direction as a consequence of the rotation of said flier in said one direction, whereby said member is caused to protrude relatively to said flier.

2. A fishing reel as set forth in claim 1, including friction means, said crank means and said flier being operatively connected by said friction means, and including means to check the rotation of the flier during rotation of said crank means in the reverse direction.

3. A fishing reel as set forth in claim 1, including spring means, said pick-up member and said spring means being operatively connected to displace said pick-up member radially inwardly as a consequence of the movement of the flier to the position remote from the spool.

4. In a fishing reel including a normally non-rotating spool arranged to hold a line and mounted for free delivery of the line therefrom substantially axially of the spool, a line pick-up device including an axially displaceable flier arranged to encircle the spool, lever means operable in one direction for axially displacing the flier to a position remote from the spool and return means operable in the other direction to return the flier to a position encircling the spool, common means for rotating the flier to wind in the line when it is in spool encircling position and to impart a reciprocating axial movement to said spool, a braking device including a ring rotatable with said spool and slidingly mounted relative to said spool, and a braking shoe mounted to exert a braking action on said ring to normally hold said spool against rotation.

5. A fishing reel as set forth in claim 4, in which said spool is provided with apertures parallel to its axis and the ring of the braking device is provided with stems parallel to the axis of the spool engaging slidingly in the apertures of the spool.

6. In a fishing reel including a frame, a spool arranged to hold a line and mounted for free delivery of the line therefrom substantially axially of the spool, said spool being normally held against rotation, a line pick-up device including a rotatable and axially slidable shaft, a movable flier mounted for axial movement with said shaft arranged to normally encircle the spool, crank means to rotate said shaft, lever means operable upon rotation of said crank a part turn in a casting direction to move said shaft axially for moving the flier axially to a casting position axially displaced from the spool, and means operable upon rotation of the shaft in the reeling-in direction to return the flier to a reeling-in position encircling the spool, crank means imparting a reciprocating axial movement to said spool with respect to said flier when said shaft is rotated in the reeling-in direction, and a one direction escapement device controlling said lever operated by reverse rotation of said crank.

7. In the fishing reel of claim 6, including a drum, said spool being mounted coaxially of and axially slidable with respect to said drum but fixed for rotation with said drum, and an adjustable brake means to exert a braking pressure on said drum whereby, while reeling-in, the spool may turn and the line pay out as may be necessary upon a predetermined tension developing in the line to keep the fish from breaking the line.

8. A friction brake as set forth in claim 7, in which the spool is provided with a series of holes arranged in a circle, the drum being provided with stems disposed to slidingly engage said holes.

9. A friction brake as set forth in claim 7, in which said adjustable brake means includes control means so located as to be manually operable.

10. In a fishing reel including a housing, a spool arranged to hold a line and mounted for free delivery of the line therefrom substantially axially of the spool, a line pick-up device including a flier axially displaceable between a winding-in position in which the flier is arranged to encircle the spool, and a casting position in which the flier is arranged in a position remote from said winding-in position, means including a crank for rotating the flier to wind the line in when in spool encircling position, means operable by said crank for axially displacing the flier from the casting to the winding-in position when said crank rotates in winding-in direction, and to displace the flier from winding-in to casting position when said crank rotates in the reverse direction, means operated by said crank means for imparting to said spool a reciprocating axial movement in combination with said flier rotation, a pick-up member mounted in said flier for radial movement, and a cam fixedly mounted with respect to said housing, said cam being shaped and being operatively positioned with respect to said pick-up member to displace said pick-up member in radial outward direction as a consequence of the rotation of said flier during said return movement, whereby asid pick-up member is caused to protrude relatively to said flier.

11. In a fishing reel of the non-rotating spool type, a spool arranged to hold a line and mounted for free delivery of the line therefrom forwardly substantially axially of said spool, said spool being axially reciprocable when reeling in, a line pick-up device including a rotatable shaft, a flier arranged on said rotatable shaft to encircle the spool for reeling in, an extensible and retractable pick-up pin on said flier, a pair of gears adapted to rotate said shaft, a crank pin on one of said gears, a hand crank operatively connected to said one of said gears whereby rotation of said hand crank in a reeling in direction rotates said shaft, cross head means operatively connected to said crank pin and to said spool to reciprocate said spool with respect to said flier between a forwardmost and a rearmost position when said hand crank is rotated in the reeling in direction, said shaft being slidable axially to move said flier in the forward direction to a point forward of said spool to a casting position, means operable by rotating said hand crank in the direction opposite to said reeling in direction to displace said spool toward its rearmost position away from said flier and to simultaneously slide said shaft forwardly in the forward direction, and means actuated by said forward sliding of said shaft to retract said pick-up pin.

12. In a fishing reel of the non-rotating spool type including an axially slidable shaft, a spool arranged axially of said shaft to hold a line and mounted for free delivery of the line axially of the spool, a line pick-up device mounted on said shaft forwardly of said spool including a rotatable flier arranged to encircle said spool and a rectractable pick-up pin extending beyond the periphery of said flier when said reel is in reeling in condition to engage the line and wind it on the non-rotating spool, manually operated hand crank and gear means to rotate said flier to wind the line on said spool, crank pin and cross head means on one of said gear means to reciprocate said spool axially between a forward and a rearward position with respect to said flier to distribute the line on the spool as it is reeled in, a lug on said one of said gear means, lever means engageable with said shaft to project said shaft axially forward away from said spool to a casting position, means cooperating with said pick-up pin to retract said pin radially upon projection of said shaft forwardly, a one direction escapement device operable to engage said lug to displace said spool toward a rearward position upon reverse rotation of said hand crank, said lever means being cooperatively associated with said escapement device to project said slidable shaft forward to the casting position to retract said pick-up pin upon said reverse rotation of said hand crank.

References Cited in the file of this patent

UNITED STATES PATENTS

| | | |
|---|---|---|
| 1,663,800 | Kautzky | Mar. 27, 1928 |
| 2,144,635 | Norton | Jan. 24, 1939 |
| 2,620,052 | Anderson | Dec. 2, 1952 |
| 2,676,769 | Sarah | Apr. 27, 1954 |
| 2,687,855 | Shakespeare et al. | Aug. 31, 1954 |
| 2,705,113 | Bonanno | Mar. 29, 1955 |
| 2,711,292 | Taggart et al. | June 21, 1955 |
| 2,728,535 | Young | Dec. 27, 1955 |
| 2,755,034 | Eisle | July 17, 1956 |
| 2,775,417 | Freund | Dec. 25, 1956 |
| 2,828,088 | Denison et al. | Mar. 25, 1958 |
| 2,834,559 | Nagy | May 13, 1958 |
| 2,854,200 | Montgomery | Sept. 30, 1958 |
| 2,862,679 | Denison et al. | Dec. 2, 1958 |
| 2,988,298 | Purnell | June 13, 1961 |